United States Patent
Zhou (10) Patent No.: US 12,375,566 B2
(45) Date of Patent: Jul. 29, 2025

(54) DATA TRANSMISSION METHOD, APPARATUS AND DEVICE, AND COMPUTER-READABLE STORAGE MEDIUM

(71) Applicant: BEIJING CHJ INFORMATION TECHNOLOGY CO., LTD., Beijing (CN)

(72) Inventor: Peng Zhou, Beijing (CN)

(73) Assignee: BEIJING CHJ INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/694,915

(22) PCT Filed: Sep. 19, 2022

(86) PCT No.: PCT/CN2022/119675
§ 371 (c)(1),
(2) Date: Mar. 22, 2024

(87) PCT Pub. No.: WO2023/045878
PCT Pub. Date: Mar. 30, 2023

(65) Prior Publication Data
US 2024/0340345 A1 Oct. 10, 2024

(30) Foreign Application Priority Data
Sep. 23, 2021 (CN) .......................... 202111117241.0

(51) Int. Cl.
*G06F 15/16* (2006.01)
*H04L 9/40* (2022.01)
(Continued)

(52) U.S. Cl.
CPC .......... *H04L 67/12* (2013.01); *H04L 63/0428* (2013.01); *H04L 69/18* (2013.01)

(58) Field of Classification Search
None
See application file for complete search history.

(56) References Cited

U.S. PATENT DOCUMENTS 10,917,263 B1  2/2021  Sheehan et al.
12,052,743 B2 *  7/2024  Panteleev ............. H04L 5/0053
(Continued)

FOREIGN PATENT DOCUMENTS

CN   106713320   5/2017
CN   108289063   7/2018
(Continued)

OTHER PUBLICATIONS

CNIPA, First Office Action for CN Application No. 202111117241.0, May 20, 2023.
(Continued)

*Primary Examiner* — Phuoc H Nguyen
(74) *Attorney, Agent, or Firm* — Hodgson Russ LLP (57) ABSTRACT

A method for transmitting data includes receiving a data transmission request from a target service node. The data transmission request carries a target interface descriptor. The target interface descriptor includes a target resource location address and a target communication protocol type. The target interface descriptor is a common descriptor used by a vehicle network to which the target service node belongs. The target interface descriptor further includes a communication parameter. The method also includes in response to the data transmission request, forwarding data between the target service node and a target resource location corresponding to the target resource location address using a target communication protocol corresponding to the target communication protocol type in a plurality of preset communication protocols.

16 Claims, 4 Drawing Sheets

---

S210: receive a data transmission request from a target service node, in which the data transmission request carries a target interface descriptor, the target interface descriptor includes a target resource location address and a target communication protocol type, and the target interface descriptor is a common descriptor used by a vehicle network to which the target service node belongs S220: in response to the data transmission request, forward data between the target service node and a target resource location corresponding to the target resource location address using a target communication protocol corresponding to the target communication protocol type in a plurality of preset communication protocols (51) Int. Cl.
*H04L 67/12* (2022.01)
*H04L 69/18* (2022.01)

(56) References Cited

U.S. PATENT DOCUMENTS

| | | | |
|---|---|---|---|
| 2005/0010816 A1 | 1/2005 | Yu et al. | |
| 2012/0218974 A1 | 8/2012 | Zhou et al. | |
| 2017/0251028 A1 | 8/2017 | Bollapalli et al. | |
| 2018/0007140 A1* | 1/2018 | Brickell | H04L 67/02 |
| 2018/0331894 A1 | 11/2018 | Naga et al. | |
| 2019/0158890 A1* | 5/2019 | Chellappan | G06F 9/30003 |
| 2020/0128077 A1 | 4/2020 | Yu et al. | |
| 2020/0154320 A1 | 5/2020 | Xu et al. | |
| 2020/0344725 A1 | 10/2020 | Liu | |
| 2021/0266346 A1 | 8/2021 | Gordon et al. | |
| 2022/0131676 A1* | 4/2022 | Zhang | H04L 5/005 |
| 2022/0132455 A1* | 4/2022 | Gupta | H04W 60/00 |
| 2022/0141684 A1* | 5/2022 | Li | H04W 56/001 370/337 |
| 2022/0141708 A1* | 5/2022 | Arrobo Vidal | H04W 28/06 370/329 |
| 2022/0183049 A1* | 6/2022 | Lee | H04W 76/20 |
| 2022/0201638 A1* | 6/2022 | Arrobo Vidal | H04W 48/08 |
| 2022/0369198 A1* | 11/2022 | Jagannatha | H04W 40/02 |
| 2023/0074838 A1* | 3/2023 | De Foy | H04L 63/0428 |

FOREIGN PATENT DOCUMENTS

| | | |
|---|---|---|
| CN | 108702381 | 10/2018 |
| CN | 109450952 | 3/2019 |
| CN | 111049854 | 4/2020 |
| CN | 111193716 | 5/2020 |
| CN | 111614694 | 9/2020 |
| CN | 111818136 | 10/2020 |
| CN | 112218386 | 1/2021 |
| CN | 112671638 | 4/2021 |
| CN | 113163263 | 7/2021 |
| CN | 113179330 | 7/2021 |
| CN | 113242534 | 8/2021 |
| CN | 113347017 | 9/2021 |
| CN | 113391589 | 9/2021 |
| CN | 113938531 | 1/2022 |
| CN | 114244915 | 3/2022 |

OTHER PUBLICATIONS

WIPO, International Search Report and Written Opinion for PCT/CN2022/119675, Dec. 21, 2022.
CNIPA, Notification to Grant Patent Right for Invention for CN Application No. 202111117241.0, Oct. 7, 2023.
Yin et al., "Research on Reprogramming Using OTA Technology in Wireless Sensor Network," Natural Science Journal of Xiangtan University, Jun. 2010, vol. 32, No. 2.
Lu, "Design and Implementation of Interlaken LA Protocol Interface Circuit," Dissertation for Dalian University of Technology, 2017.
Gao et al., "Admissible consensus for DMASs based on an observer-type consensus protocol with output feedback," Proceedings of the 38th Chinese Control Conference, 2019.
EPO, Extended European Search Report for EP Application No. 22871924.1, Nov. 27, 2024.

* cited by examiner

DATA TRANSMISSION METHOD, APPARATUS AND DEVICE, AND COMPUTER-READABLE STORAGE MEDIUM

CROSS REFERENCE TO RELATED APPLICATIONS

This application is a U.S. national phase entry under 35 U.S.C. § 371 of International Application No. PCT/CN2022/119675, filed on Sep. 19, 2022, which claims priority to Chinese Patent Application No. 202111117241.0, filed on Sep. 23, 2021, the entire disclosures of which are incorporated herein by reference.

TECHNICAL FIELD

The disclosure relates to a field of data transmission technologies, in particular to a method, an apparatus, a device, a computer-readable storage medium, a computer program product and a computer program for transmitting data.

BACKGROUND

Automotive applications often require the cooperation of multiple application service nodes to accomplish corresponding operations, such as data acquisition, data analysis and processing, and peripheral actuator control. This makes the transmission of instructions and data between application service nodes increasingly important.

Since different application service nodes may be arranged in a same controller or in different controllers, different communication protocols may be used for completing the transfer of data, instructions, faults and other information between different application service nodes.

SUMMARY

According to a first aspect, embodiments of the disclosure provide a method for transmitting data. The method includes:
  receiving a data transmission request from a target service node, in which the data transmission request carries a target interface descriptor, the target interface descriptor includes a target resource location address and a target communication protocol type, the target interface descriptor is a common descriptor used by a vehicle network to which the target service node belongs; and the target interface descriptor further comprises a communication parameter; and
  in response to the data transmission request, forwarding data between the target service node and a target resource location corresponding to the target resource location address using a target communication protocol corresponding to the target communication protocol type in a plurality of preset communication protocols.

According to a second aspect, embodiments of the disclosure provide a device for transmitting data. The device includes:
  a processor; and
  a memory for storing executable instructions:
  in which, the processor is configured to read the executable instructions from the memory and to execute the executable instructions to:
  receive a data transmission request from a target service node, in which the data transmission request carries a target interface descriptor, the target interface descriptor includes a target resource location address and a target communication protocol type, the target interface descriptor is a common descriptor used by a vehicle network to which the target service node belongs; and the target interface descriptor further comprises a communication parameter; and
  in response to the data transmission request, forward data between the target service node and a target resource location corresponding to the target resource location address using a target communication protocol corresponding to the target communication protocol type in a plurality of preset communication protocols.

According to a third aspect, embodiments of the disclosure provide a non-transitory computer-readable storage medium having a computer program stored thereon. When the computer program is executed by a processor, the processor is caused to perform the method for transmitting data: the method including:
  receiving a data transmission request from a target service node, in which the data transmission request carries a target interface descriptor, the target interface descriptor includes a target resource location address and a target communication protocol type, the target interface descriptor is a common descriptor used by a vehicle network to which the target service node belongs; and the target interface descriptor further comprises a communication parameter; and the target interface descriptor further comprises a communication parameter; and
  in response to the data transmission request, forwarding data between the target service node and a target resource location corresponding to the target resource location address using a target communication protocol corresponding to the target communication protocol type in a plurality of preset communication protocols.

BRIEF DESCRIPTION OF THE DRAWINGS

The above and other features, advantages, and aspects of embodiments of the disclosure will become more apparent in combination with the accompanying drawings and with reference to the following specific implementations. Throughout the accompanying drawings, the same or similar reference numbers indicate the same or similar elements. It is understandable that the accompanying drawings are schematic and that the originals and elements are not necessarily drawn to scale.

DETAILED DESCRIPTION

Embodiments of the disclosure will be described in detail below with reference to the accompanying drawings. Although some embodiments of the disclosure are shown in the drawings, it is understandable that the disclosure may be embodied in various forms and should not be construed as limited to embodiments set forth herein. Instead, these embodiments are provided for a more thorough and complete understanding of the disclosure. It is understandable that the drawings and embodiments of the disclosure are for illustrative purposes only and are not intended to limit the scope of the disclosure.

It is understandable that the various steps in method embodiments of the disclosure may be performed in a different order and/or in parallel. Furthermore, method embodiments may include additional steps and/or omit performance of illustrated steps. The scope of the disclosure is not limited in this regard.

As used herein, the term "include" and its variations are inclusive, i.e., "including but not limited to". The term "based on" means "based at least in part on". The term "an embodiment" means "at least one embodiment". The term "another embodiment" means "at least one additional embodiment". The term "some embodiments" means "at least some embodiments". Relevant definitions of other terms will be given in the description below.

It is noteworthy that the concepts of "first" and "second" mentioned in the disclosure are only used to distinguish between different devices, modules or units, and are not intended to limit the order or interdependence of the functions performed by these devices, modules or units.

It is noteworthy that the modifications of "one" and "a plurality of" in the disclosure are schematic rather than limiting, and those skilled in the art should understand that they should be understood as "one or more" unless the context clearly indicates otherwise.

The names of the messages or information interacted with between the plurality of devices of embodiments of the disclosure are used for illustrative purposes only and are not intended to place limitations on the scope of those messages or information.

Automotive Service-Oriented Architecture (SOA) and software-defined vehicles are gradually becoming a trend of future automotive application development. Through the design of SOA or data-oriented architecture, the application service nodes corresponding to application services are loosely coupled, so as to enhance the flexibility and extensibility of platform and electronic/electrical (E/E) architecture. The existence of middleware, i.e., communication interface, is the basis for the feasibility of these architectures.

Vehicle Ethernet, i.e., vehicle network, has become the backbone network of automobiles. The bandwidth advantage of Ethernet enables it to carry more business scenarios than those of traditional data buses such as Controller Area Network (CAN), Local Interconnect Networks (LIN), etc. However, the communication protocol of Ethernet is relatively complex, and requires a lot of data reliability and security considerations for the application layer protocol.

Even with a mature three-party communication middleware, interface configuration parameters, connection parameters, interface version compatibility and other issues may lead to errors in the docking of various business parties. In addition, the requirements of intra-domain and inter-domain communication scenarios are completely different. Inter-domain communication faces a relatively complex network environment and has to consider data priority and reliability, whereas intra-domain communication places more emphasis on resource consumption, and the number of copy times, so that the requirements for communication protocols are also different.

Automotive applications often require the cooperation of multiple application service nodes to accomplish corresponding operations, such as data acquisition, data analysis and processing, and peripheral actuator control. This makes the transmission of instructions and data between application service nodes increasingly important.

However, based on the existing vehicle network, since different application service nodes may be arranged in the same controller or in different controllers, different communication protocols may be used for completing the transfer of data, instructions, faults and other information between different application service nodes. Currently, different interface description manners are used for different communication protocols, which makes the configuration and debugging process of the interface difficult and prone to errors during use.

Embodiments of the disclosure provide method, an apparatus, a device, a computer-readable storage medium, a computer program product and a computer program for transmitting data, which may be used for communication between application service nodes of different communication protocol types.

The application scenario in which the method for transmitting data is applied according to embodiments of the disclosure will be described at first.

Figure 1:
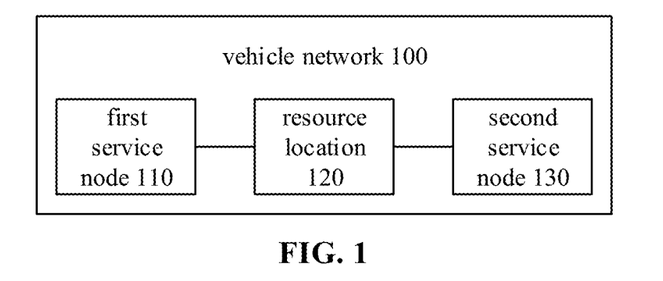
FIG. 1 is a schematic diagram illustrating a data transmission scenario according to an embodiment of the disclosure.

FIG. 1 is a schematic diagram illustrating a data transmission scenario according to an embodiment of the disclosure.

FIG. 1 illustrates a data transmission scenario between a first service node 110 and a second service node 130 in a vehicle network 100.

The first service node 110 and the second service node 130 may be application service nodes that support the automotive application. In some specific embodiments, each application service node may be a controller or may be a process in a controller.

Data transmission between the first service node 110 and the second service node 130 may be realized through a resource location 120. In some implementations, the first service node 110 may perform data transmission with the resource location 120, and the second service node 130 may also perform data transmission with the resource location 120, and thus the data transmission between the first service node 110 and the second service node 130 may be realized.

For example, when the first service node 110 wants to send data to the second service node 130, the first service node 110 may send the data to the resource location 120, and the second service node 130 may obtain the data sent by the first service node 110 from the resource location 120, so that the data transmission between the first service node 110 and the second service node 130 may be realized.

In embodiments of the disclosure, the first service node 110 conducts data transmission with the resource location 120 in the same manner as the second service node 130 conducts data transmission with the resource location 120.

The following description takes the data transmission between the first service node 110 and the resource location 120 as an example.

A communication interface may be installed within the first service node 110. The communication interface may be a software interface.

In some implementations, the first service node 110 may send a data transmission request to a communication interface installed in the first service node 110. The communication interface may receive the data transmission request sent by the first service node 110. The data transmission request may carry an interface descriptor, which may include a resource location address of the resource location 120 and a communication protocol type for data transmission between the first service node 110 and the resource location 120. The interface descriptor may be a common descriptor used by the vehicle network 100. After receiving the data transmission request, the communication interface, in response to the data transmission request, may use a communication protocol corresponding to the communication protocol type in a plurality of preset communication protocols pre-stored in the communication interface to forward data between the first service node 110 and the resource location 120.

Since the interface descriptor carried by the data transmission request is a common descriptor used by the vehicle network, the resource location and the target communication protocol type in the interface descriptor may be read under any communication protocol type. In response to the data transmission request, data may be forwarded between the service node and the resource location using the communication protocol corresponding to the communication protocol type in the plurality of preset communication protocols pre-stored in the communication interface. Therefore, the data transmission between the service node and the resource location may be realized under any communication protocol type, which improves the universality of the interface descriptor for different communication protocol types and improves the universality of the communication interface for different communication protocol types.

The method for transmitting data according to embodiments of the disclosure will be described below in combination with FIGS. 2-7.

In embodiments of the disclosure, the method for transmitting data may be performed by a communication interface installed on an application service node in a vehicle network.

The vehicle network may be a transport network formed by a plurality of application service nodes applied to support automotive applications. An application service node may be a controller or a process in a controller. The communication interface may be a software interface.

Figure 2:
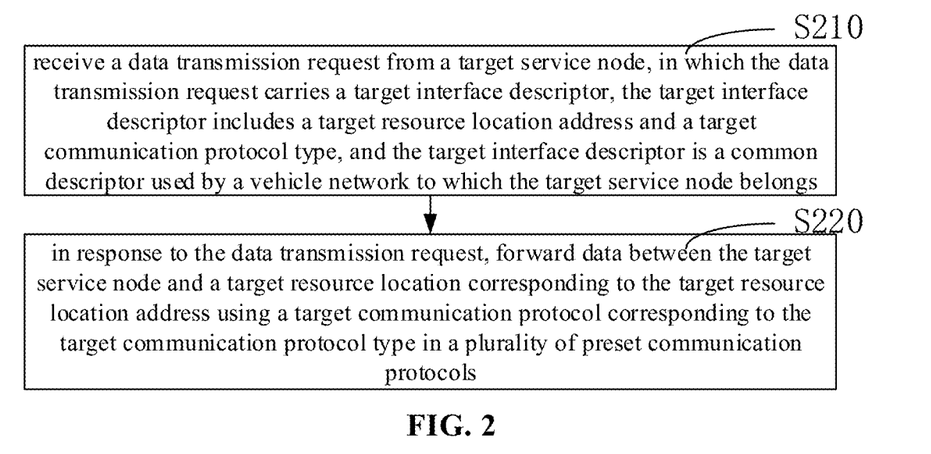
FIG. 2 is a flowchart illustrating a method for transmitting data according to an embodiment of the disclosure.

FIG. 2 is a flowchart illustrating a method for transmitting data according to an embodiment of the disclosure.

As shown in FIG. 2, the method for transmitting data includes the following.

At block S210, a data transmission request is received from a target service node, in which the data transmission request carries a target interface descriptor, the target interface descriptor includes a target resource location address and a target communication protocol type, and the target interface descriptor is a common descriptor used by a vehicle network to which the target service node belongs.

In embodiments of the disclosure, the target service node may be any of the application service nodes in the vehicle network.

The target service node may perform data transmission through the target resource location corresponding to the target resource location address, so that the target service node may transmit data with any of other application service nodes associated with the target resource location. The application service nodes associated with the target resource location may be other application service nodes that perform the data transmission with the target resource location. Therefore, the data transmission between the target service node and any of the above-described other application service nodes may be realized.

When the target service node needs to transmit data with the target resource location corresponding to the target resource location address, the target service node may send the data transmission request to the target communication interface installed in the target service node, and the target communication interface receives the data transmission request.

In embodiments of the disclosure, the data transmission request may be a request sent by the target service node to the target communication interface installed therein for triggering the target communication interface to perform the data transmission.

In some embodiments, the data transmission request may be a data sending request. In some embodiments, the data sending request may be used for publishing a subscription message or for sending a request message, which is not limited herein.

In other embodiments, the data transmission request may be a data receiving request. In some embodiments, the data receiving request may be used for obtaining a subscription message or may be used for receiving a request message, which is not limited herein.

In embodiments of the disclosure, the target interface descriptor is a string carried by the data transmission request, containing the target resource location address and the target communication protocol type.

The target interface descriptor is a common descriptor used by the vehicle network to which the target service node belongs. That is, the same interface descriptor may be used for any of communication protocol types corresponding to the target service node in the vehicle network.

In some embodiments, the target resource location address may be an address of the target resource location at which the target service node requires to perform the data transmission. That is, the target resource location address may enable the target communication interface to determine the target resource location at which the data transmission is required to be performed.

In other embodiments, the target communication protocol type may be information about the type of a communication protocol used for the data transmission between the target service node and the target resource location. That is, the target resource location address enables the target communication interface to determine the communication protocol used for performing the data transmission with the target resource location.

In embodiments of the disclosure, the target communication interface uses the target communication protocol type in the target interface descriptor to determine the communication protocol agreed upon between the target service node and the target resource location, and uses the target resource location address in the target interface descriptor to determine the address of the target resource location, which reduces bias due to inconsistent reception constraints.

At block S220, in response to the data transmission request, data is forwarded between the target service node and a target resource location corresponding to the target resource location address using a target communication protocol corresponding to the target communication protocol type in a plurality of preset communication protocols.

In embodiments of the disclosure, the preset communication protocols may be communication protocols pre-stored in the target communication interface. Each preset communication protocol may correspond to a respective communication protocol type.

In some specific embodiments, after receiving the data transmission request, in response to the data transmission request, the target communication interface may extract the target resource location address and the target communication protocol type in the data transmission request. The target communication protocol corresponding to the target communication protocol type in the plurality of preset communication protocols is used for forwarding data between the target service node and the target resource location corresponding to the target resource location address, thereby realizing the data transmission corresponding to the data transmission request.

In embodiments of the disclosure, after receiving the data transmission request from the target service node, since the target interface descriptor carried by the data transmission request is a common descriptor used by the vehicle network to which the target service node belongs, the target resource location and the target communication protocol type in the target interface descriptor may be read out under any communication protocol type. In response to the data transmission request, the data may be forwarded between the target service node and the target resource location using the target communication protocol corresponding to the target communication protocol type in the plurality of communication protocols. Therefore, the data transmission between the target service node and the target resource location may be realized under any communication protocol type, which improves the universality of the interface descriptor for different communication protocol types and improves the universality of the communication interface for different communication protocol types, thereby reducing the error rate during use.

In some embodiments of the disclosure, the target interface descriptor may further include communication parameters.

The communication parameters may be various configuration parameters used in realizing the data transmission between the target service node and the target resource location. For example, the communication parameters may include a baud rate, data bits, a stop bit, or other parameters.

Correspondingly, performing the data transmission between the target service node and the target resource location corresponding to the target resource location address may include: forwarding the data between the target service node and the target resource location based on the communication parameters.

In some implementations, when the target communication interface forwards data between the target service node and the target resource location, the target communication interface needs to configure parameters for this data transmission based on the communication parameters, and thus the data is forwarded between the target service node and the target resource location corresponding to the target resource location address.

After receiving the data transmission request, in response to the data transmission request, the target communication interface may extract the target resource location address, the target communication protocol type, and the communication parameters from the data transmission request. Based on the communication parameters, the parameters of the data transmission are configured. The target communication protocol is used to achieve data forwarding between the target service node and the target resource location, so as to achieve data transmission corresponding to the data transmission request.

The target interface descriptor containing the target resource location address, the target communication protocol type and the communication parameters will be described below.

For example, the target service node is a publish node, other application service nodes with which the target service node transmits data are subscriber nodes, and the target service node is a creator of data transmission. When the target service node communicates with the other application service nodes using a communication protocol 1 which may be represented by "proto1", the target service node and the other application service nodes may use the communication protocol 1 to perform the data transmission through the target resource location (the target resource location may be represented by "local host: 1122"). The service provided by the target service node may be represented by "helloworld", requiring two parameters, i.e., param1 and param2. The value of param1 is 1 and the value of param2 is 2. The target interface descriptor may be the following string:

proto1://localhost:1122/helloworld?param1=1&param=2.

At this time, the target service node may use the target interface descriptor for message releasing, and other application service nodes may use the target interface descriptor for message subscription.

As another example, the target service node is a request node, other application service nodes with which the target service node transmits data are response nodes, and the other application service nodes are creators of data transmission. When the target service node communicates with the other application service nodes using a communication protocol 2 which may be represented by "proto2", the target service node and the other application service nodes may use the communication protocol 2 to realize data transmission through the target resource location. The target resource location may be represented by "localhost: 2233" and the service provided by the target service node may be represented by "helloworld". The service requires two parameters, i.e., param1 and param2. The value of param1 is 1 and the value of param2 is 2. The target interface descriptor may be the following string:

proto2://localhost:2233/helloworld?param1=1&param=2.

At this time, the other application service nodes may use the target interface descriptor for service monitoring, and the target service node may use the target interface descriptor for invoking services provided by the other application service nodes and receiving response messages returned by the other application service nodes.

As a result, the target interface descriptor may combine the target resource location address, the target communication protocol type, and the communication parameters required to establish the data transmission, to ensure that no additional constraints are required in establishing a successful connection between the two parties of the data transmission.

In other embodiments of the disclosure, before receiving the data transmission request from the target service node, the method for transmitting data may further include: receiving an interface initialization instruction from the target service node, in which the interface initialization instruction carries the target communication protocol type; and in response to the interface initialization instruction, performing an interface initialization operation to activate the target communication protocol corresponding to the target communication protocol type.

In some implementations, after the installation of the target communication interface within the target service node is completed, the target service node may send the interface initialization instruction to the target communication interface, and the target communication interface receives the interface initialization instruction from the target service node. After receiving the interface initialization instruction, in response to the interface initialization instruction, the target communication interface performs the interface initialization operation to realize the initial settings of the target communication interface. After the initial settings of the target communication interface are completed, the target communication protocol corresponding to the target communication protocol type is activated. That is, the target communication protocol within the target communication interface is in an active state, and other communication protocols are in an inactive state.

After the installation of the target communication interface within the target service node is completed, a plurality of preset communication protocols in the target communication interface are in an inactive state. The interface initialization instruction may include the target communication protocol type, so that the target communication interface may activate the target communication protocol corresponding to the target communication protocol type in the course of performing the interface initialization operation.

In embodiments of the disclosure, after the initial settings of the target communication interface are completed, when the target communication interface receives the data transmission request from the target service node and extracts the target resource location address and the target communication protocol type from the target interface descriptor, the target communication interface, in response to the data transmission request, may directly use the target communication protocol that is in an active state among the plurality of preset communication protocols to forward data between the target service node and the target resource location corresponding to the target resource location address.

In some embodiments of the disclosure, before performing the data transmission between the target service node and the target resource location corresponding to the target resource location address by using the target communication protocol corresponding to the target communication protocol type among the plurality of preset communication protocols, the method for transmitting data further includes: searching for the target communication protocol corresponding to the target communication protocol type from the plurality of pre-stored preset communication protocols.

In some implementations, after the target communication interface receives the data transmission request from the target service node and extracts the target resource location address and the target communication protocol type from the target interface descriptor, the target communication interface may search the plurality of pre-stored preset communication protocols for the target communication protocol corresponding to the target communication protocol type, and uses the found target communication protocol to complete the data forwarding between the target service node and the target resource location.

In other implementations, in order to make the data transmission between the application service nodes more secure, forwarding the data between the target service node and the target resource location corresponding to the target resource location address may include: encrypting through an encryption component and transmitting data between the target service node and the target resource location.

In some implementations, before the target communication interface forwards the data between the target service node and the target resource location, the target communication interface first sends the acquired data to be transmitted to the encryption component, so that the encryption component may encrypt or decrypt the data to be transmitted, and then the encrypted or decrypted data to be transmitted is sent to a transmission destination. The encryption component may use an encryption and decryption method corresponding to the target communication protocol type to encrypt and decrypt the data to be transmitted.

In embodiments of the disclosure, the encryption component may be a hardware component mounted within an in-vehicle system that is communicatively coupled with the target communication interface, thereby enhancing the computational speed and security level of encryption and decryption.

In embodiments of the disclosure, when the data is forwarded between the target service node and the target resource location, the data to be transmitted between the target service node and the target resource location may be encrypted and decrypted through the encryption component. The computing speed of encryption and decryption may be improved due to the high data processing speed of the hardware component. Since the hardware component and the target communication interface are independent relative to each other, the security level of encryption and decryption may be improved.

In some embodiments of the disclosure, in the case where the data transmission request is a data sending request, the data transmission request may also carry the data to be transmitted.

In these embodiments, the data to be transmitted may be data sent by the target service node during the data transmission between the target service node and the target resource location.

Encrypting through the encryption component and transmitting data between the target service node and the target resource location may include: sending the data to be transmitted to the encryption component, in which the data to be transmitted is encrypted by the encryption component based on an encryption mode corresponding to the target communication protocol type; receiving encrypted data to be transmitted fed back by the encryption component; and sending the encrypted data to be transmitted to the target resource location.

Figure 3:
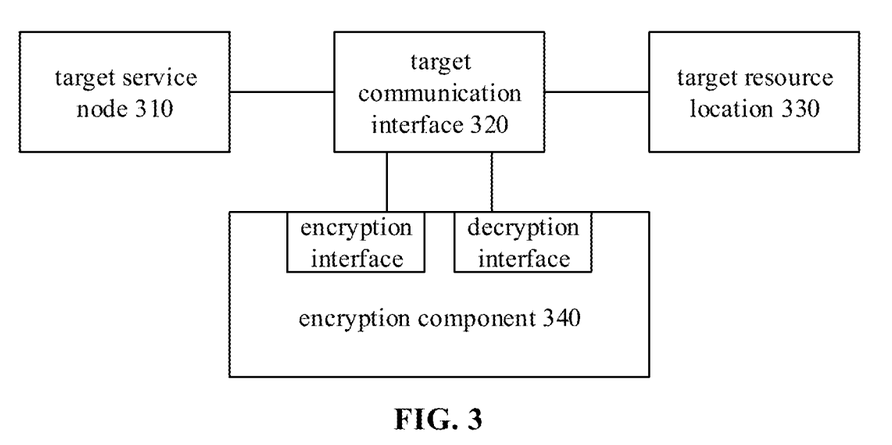
FIG. 3 is a schematic diagram illustrating a data encryption and decryption process according to an embodiment of the disclosure.

FIG. 3 is a schematic diagram illustrating a data encryption and decryption process according to an embodiment of the disclosure.

As illustrated in FIG. 3, when a target service node 310 sends data to be transmitted to a target resource location 330, a target communication interface 320 may use the target communication protocol to send the data to be transmitted sent by the target service node 310 to an encryption component 340 via an encryption interface of the encryption component 340. After obtaining the data to be transmitted, the encryption component 340 may encrypt the data to be transmitted based on an encryption mode corresponding to the target communication protocol type, and feed the encrypted data to be transmitted back to the target communication interface 320 using the target communication protocol. After receiving the encrypted data to be transmitted, the target communication interface 320 may send the encrypted data to be transmitted to the target resource location 330 using the target communication protocol, thereby realizing encryption and transmission of the data between the target service node 310 and the target resource location 330.

In other embodiments of the disclosure, when the data transmission request is a data obtaining request, the data to be transmitted may be data acquired by the target resource location during the data transmission between the target service node and the target resource location.

Encrypting through the encryption component and transmitting data between the target service node and the target resource location may include: obtaining encrypted data to be transmitted from the target resource location: sending the encrypted data to be transmitted to the encryption component, in which the encrypted data to be transmitted is decrypted by the encryption component based on a decryption mode corresponding to the target communication protocol type; and sending the data to be transmitted to the target service node.

With reference to FIG. 3, when the target service node 310 obtains the data to be transmitted from the target resource location 330, the target communication interface 320 may obtain the encrypted data to be transmitted from the target resource location 330 using the target communication protocol, and send the encrypted data to be transmitted to the encryption component 340 by utilizing the target communication protocol via a decryption interface of the encryption component 340. After obtaining the encrypted data to be transmitted, the encryption component 340 may decrypt the encrypted data to be transmitted based on the decrypting mode corresponding to the target communication protocol type and feed back the data to be transmitted to the target communication interface 320 by using the target communication protocol. After receiving the data to be transmitted, the target communication interface 320 may send the data to be transmitted to the target service node 310, thereby realizing the encryption and transmission of the data between the target service node 310 and the target resource location 330.

As a result, in embodiments of the disclosure, efficient encryption and transmission of the data between the target service node and the target resource location may be performed at a high-security level by means of a hardware-based encryption component, which makes data transmission between application services nodes more secure.

In other implementations, when the data transmission request is a data sending request, the data transmission request may carry the data to be transmitted.

In these embodiments, the data to be transmitted may be data sent by the target service node during the data transmission between the target service node and the target resource location.

Correspondingly, forwarding data between the target service node and the target resource location corresponding to the target resource location address may include: sending the data to be transmitted to the target resource location.

In some implementations, after receiving the data transmission request, the target communication interface may, in response to the data transmission request, extract the target resource location address, the target communication protocol type and the data to be transmitted from the data transmission request, and then use the target communication protocol corresponding to the target communication protocol type to send the data to be transmitted to the target resource location.

In embodiments of the disclosure, in order to facilitate the external device to analyze and test the data transmitted within the vehicle network using a non-network communication mode, when the target communication protocol belongs to the non-network communication mode, after sending the data to be transmitted to the target resource location, the method for transmitting data may further include: sending the data to be transmitted to a message subscriber node by using the target communication protocol, so that the message subscriber node may send the data to be transmitted to the external device in a network communication mode.

The message subscriber node may be a diversion node that is communicatively connected to the target communication interface by means of message subscription.

The target interface descriptor is a common descriptor used by the vehicle network, which may ensure that the data at the upper layer application protocol level is interchangeable among the communication protocols, and thus the diversion node may be used to perform packet capture of the data to be transmitted.

Figure 4:
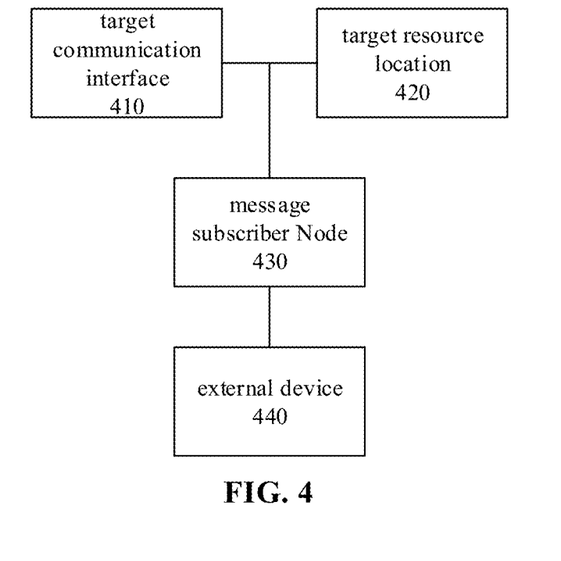
FIG. 4 is a schematic diagram illustrating a data capture architecture according to an embodiment of the disclosure.

FIG. 4 is a schematic diagram illustrating a data capture architecture according to an embodiment of the disclosure.

As illustrated in FIG. 4, after a target communication interface 410 sends the data to be transmitted to a target resource location 420, the target communication interface 410 may also send the data to be transmitted to a message subscriber node 430 by means of the packet capture of the message subscriber node by using the target communication protocol. After receiving the data to be transmitted, the message subscriber node 430 may send the data to be transmitted to an external device 440 through a network communication mode. The external device 440 may analyze and test the received data to be transmitted to determine whether the data to be transmitted sent by the target service node is correct.

In some embodiments, when the target communication protocol belongs to the network communication mode, the external device may be used to directly perform the packet capture of the data to be transmitted sent by the target communication interface, which is not limited herein.

As a result, in embodiments of the disclosure, no matter how to perform the data transmission, through the network communication mode or the non-network communication mode, it is possible to realize the packet capture of the data to be transmitted, thereby realizing the analysis and test of the data to be transmitted.

In another implementation of the disclosure, in order to further improve the universality of the communication interface for different communication protocol types, the preset communication protocols may be network communication protocols or non-network communication protocols.

In some embodiments, the network communication protocol may be a communication protocol corresponding to the network communication mode, and the network communication mode may realize the data transmission between different devices.

In some implementations, the network communication mode may be a data transmission method using a communication network, such as CAN, LIN, and the like.

In other embodiments, the non-network communication protocol may be a communication protocol corresponding to the non-network communication mode, and the non-network communication mode may enable data transmission between different processes in the same device.

In some implementations, the non-network communication mode may be a mode for transmitting data within the same device.

In some embodiments, the non-network communication protocol may include a hardware acceleration communication protocol.

In some implementations, the hardware acceleration communication protocol may be a communication protocol based on a direct memory access technique, such as Remote Direct Memory Access (RDMA).

In embodiments of the disclosure, since there is no need to perform layer-by-layer processing during the data transmission using the hardware acceleration communication protocol, the communication performance may be improved during the data transmission.

Figure 5:
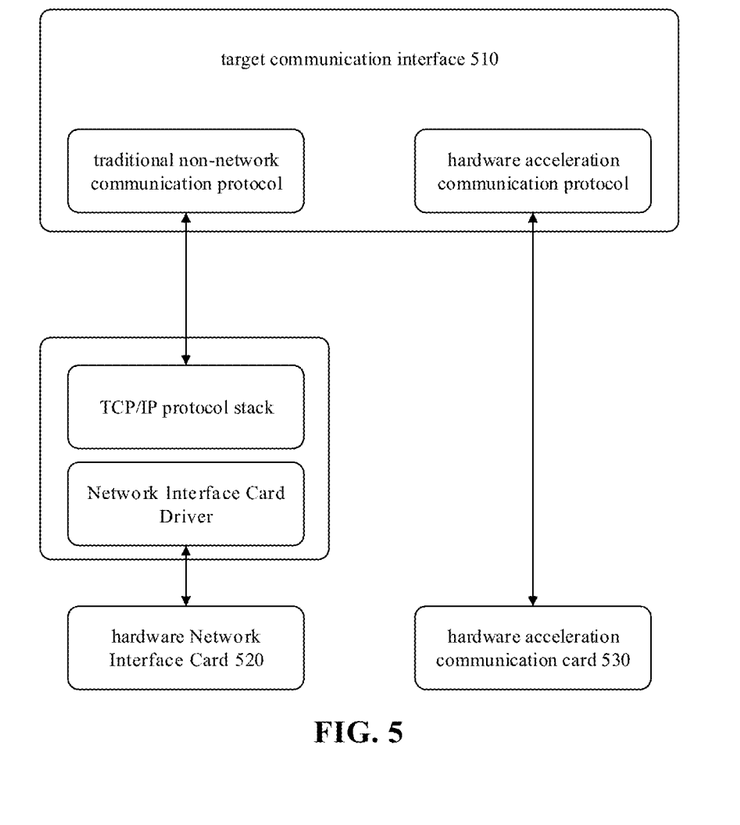
FIG. 5 is a schematic diagram illustrating a data transmission architecture according to an embodiment of the disclosure.

FIG. 5 is a schematic diagram illustrating a data transmission architecture according to an embodiment of the disclosure.

As illustrated in FIG. 5, in the automotive application scenario, for certain delay-sensitive data, they will not satisfy requirements after being processed layer by layer. Therefore, the hardware acceleration communication protocol may be used to realize the data transmission between the target communication interface 510 and the target resource location in a hardware acceleration communication card 530, so that it is possible to greatly shorten the delay without going through layer by layer software processing.

In other embodiments, the non-network communication protocol may also include a traditional non-network communication protocol, such as the TCP/IP communication protocol, which is not limited herein.

With reference to FIG. 5, in the automotive application scenario, for certain delay-insensitive data, the traditional non-network communication protocols may be used to realize data transmission between the target communication interface 510 and the target resource location in a hardware Network Interface Card 520. For example, based on a protocol stack corresponding to the TCP/IP communication protocol on the Linux system, an Network Interface Card driver is called to realize the data transmission between the target communication interface 510 and the target resource location in the hardware Network Interface Card 520. In some implementations, in this process, the target resource location in the hardware Network Interface Card 520 often has to go through layer by layer processing of the operating system, for example, Network Interface Card hardware terminal→data packet acquisition and distribution to a kernel thread→software interruption→kernel thread processing the packet in the protocol stack→notifying a user layer of the completion of the processing→the receipt of the packet on the user layer→network layer→middleware protocol processing→layer by layer processing of upper level business.

As a result, in embodiments of the disclosure, various types of communication protocols may be stored in advance within the target communication interface to meet different needs for data transmission, which further improves the universality of the communication interface with respect to different types of communication protocols.

In another implementation of the disclosure, in order to further improve the versatility of the communication interface for different types of communication protocols, after receiving the data transmission request from the target service node, the method for transmitting data further includes: converting the data transmission request into a preset encoding type; and obtaining the target interface descriptor by parsing the data transmission request.

The preset encoding type may be a pre-set encoding type of a code that may be identified by the target communication interface, which is not limited herein.

Figure 6:
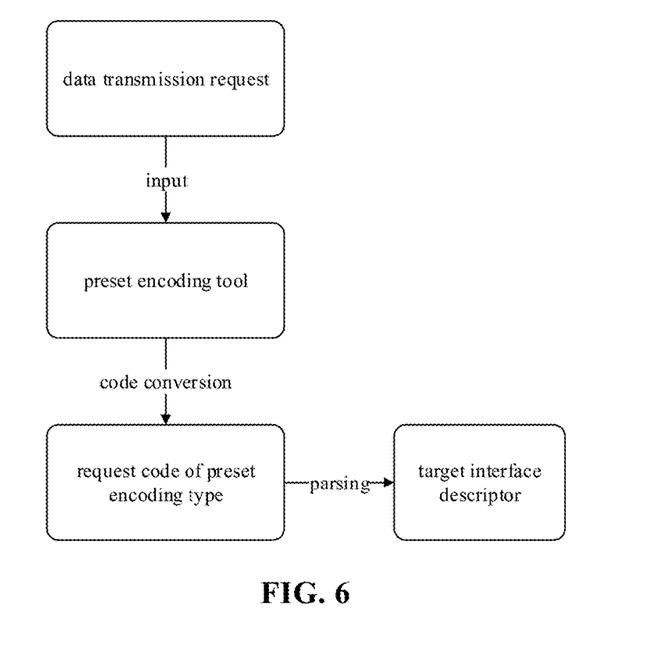
FIG. 6 is a schematic diagram illustrating a process of converting into a preset encoding type according to an embodiment of the disclosure.

FIG. 6 is a schematic diagram illustrating a process of converting into a preset encoding type according to an embodiment of the disclosure.

As illustrated in FIG. 6, after the target communication interface receives the data transmission request from the target service node, the target communication interface may input a request code of the data transmission request into a preset encoding tool. The preset encoding tool may convert the request code of the data transmission request to obtain a request code of the preset encoding type. The target communication interface may parse the request code of the preset encoding type obtained from the preset encoding tool to realize the parsing of the data transmission request, and obtain the target interface descriptor carried by the data transmission request.

As a result, in embodiments of the disclosure, the target communication interface is able to provide the preset encoding tool for performing unified code type conversion for the data transmission request, to obtain the request code of the preset encoding type. And, there is also provided a corresponding data parsing and sending interface to realize the reading and writing of the data fields in the request code of the preset encoding type, which has a better abstraction and flexibility.

In a further implementation of the disclosure, the target communication interface may include an interface abstraction layer and a communication protocol implementation layer, to hide the complexity of a certain communication protocol and expose only a very simple interface to the upper layers.

Figure 7:
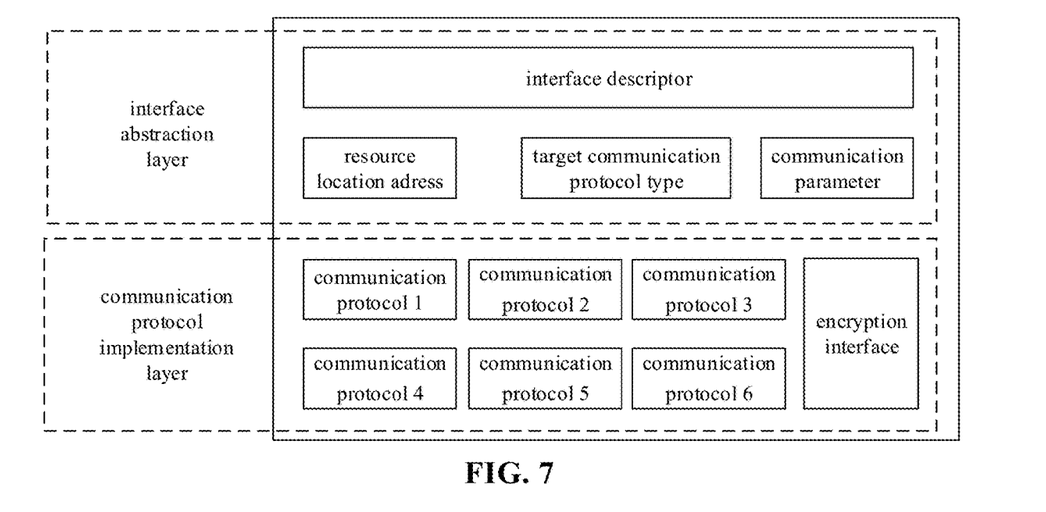
FIG. 7 is a schematic diagram illustrating a communication interface architecture according to an embodiment of the disclosure.

FIG. 7 is a schematic diagram illustrating a communication interface architecture according to an embodiment of the disclosure.

As illustrated in FIG. 7, the communication interface may have an interface abstraction layer and a communication protocol implementation layer. The interface abstraction layer may be used for receiving the data transmission request, obtaining an interface descriptor by parsing the data transmission request, and extracting the resource location address, the communication protocol type, and the communication parameters from the interface descriptor. There are 6 communication protocols stored in advance in the communication protocol implementation layer, for example, communication protocols 1 to 6. The communication protocol implementation layer may be used for transmitting data through the communication protocol corresponding to the communication protocol type and the resource location corresponding to the resource location address. The communication protocol implementation layer is also provided with an encryption interface, which is used for transmitting data with the encryption component by using the communication protocol corresponding to the communication protocol type.

In some embodiments, receiving the data transmission request from the target service node may include: receiving the data transmission request based on an interface abstraction layer.

In some specific embodiments, when the target service node needs to transmit data with the target resource location corresponding to the target resource location address, the target service node may send a data transmission request to a target communication interface installed therein, and the target communication interface may receive the data transmission request based on the interface abstraction layer.

After the target communication interface receives the data transmission request based on the interface abstraction layer, the target communication interface may, in response to the data transmission request, extract the target resource location address, the target communication protocol type and the communication parameters from the data transmission request based on the interface abstraction layer.

Moreover, performing the data transmission between the target service node and the target resource location corresponding to the target resource location address using the target communication protocol corresponding to the target communication protocol type in the plurality of preset communication protocols includes: forwarding data between the target service node and the target resource location using the target communication protocol based on a communications protocol implementation layer.

After the target communication interface extracts the target resource location address, the target communication protocol type and the communication parameters based on the interface abstraction layer, the target communication interface may send the target resource location address, the target communication protocol type and the communication parameters to the communication protocol implementation layer in the target communication interface, so that the communication protocol implementation layer, based on the communication parameters, uses the target communication protocol corresponding to the target communication protocol type to encrypt, by means of the encryption component, and transmit data between the target service node and the target resource location corresponding to the target resource location address.

As a result, in embodiments of the disclosure, the target communication interface can use the interface abstraction layer to hide details such as different communication protocols, which allows upper-layer applications to communicate through an upper-layer interface of the interface abstraction layer, such that the target communication interface is concise, the integration workload of upper-layer application codes is small, the communication performance is comparatively high, the corresponding occupied resources is small, and the efficiency of protocol docking is greatly improved. Furthermore, the use of common descriptor makes it easier to exchange and convert between different communication protocols. Meanwhile, since the communication protocol implementation layer of the target communication interface may store the preset communication protocols in advance, the flexibility of the target communication interface is improved, and it is possible to change the communication protocol type based on the need of the target service node and to re-initialize the target communication interface based on the desired communication protocol type, so that the communication protocol can be switched without modifying any code. Moreover, when the user modifies the preset communication protocols such as increasing or decreasing, the communication protocols stored within the target communication interface may be directly increased or decreased without having to modify any code. Therefore, the reuse rate of the codes is relatively high and existing services may be directly and smoothly reused on future new communication protocols and platforms.

Figure 8:
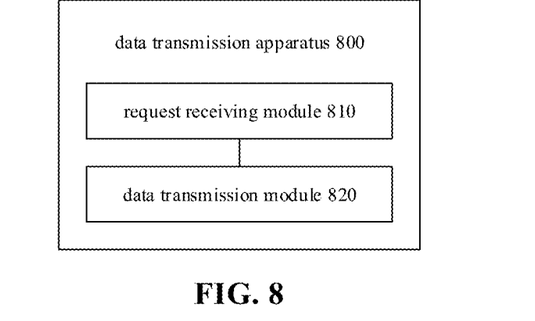
FIG. 8 is a schematic diagram illustrating an apparatus for transmitting data according to an embodiment of the disclosure.

FIG. 8 is a schematic diagram illustrating an apparatus 800 for transmitting data according to an embodiment of the disclosure.

In some embodiments of the disclosure, the apparatus illustrated in FIG. 8 may be applied to a communication interface installed on an application service node in a vehicle network.

The vehicle network may be a transport network formed by a plurality of application service nodes applied to support automotive applications. One application service node may be a controller or a process in a controller. The communication interface may be a software interface.

As illustrated in FIG. 8, the apparatus 800 for transmitting data may include a request receiving module 810 and a data transmission module 820.

The request receiving module 810 is configured to: receive a data transmission request from a target service node, in which the data transmission request carries a target interface descriptor, the target interface descriptor includes a target resource location address and a target communication protocol type, and the target interface descriptor is a common descriptor used by a vehicle network to which the target service node belongs.

The data transmission module 820 is configured to, in response to the data transmission request, forward data between the target service node and a target resource location corresponding to the target resource location address using a target communication protocol corresponding to the target communication protocol type in a plurality of preset communication protocols.

In embodiments of the disclosure, after receiving the data transmission request of the target service node, the target resource location and the target communication protocol type in the target interface descriptor may be read out under any communication protocol type since the target interface descriptor carried by the data transmission request is a common descriptor used by the vehicle network to which the target service node belongs. In response to the data transmission request, data may be forwarded between the target service node and the target resource location using the target communication protocol corresponding to the target communication protocol type in the plurality of communication protocols. Therefore, the data transmission between the target service node and the target resource location may be realized under any communication protocol type, which improves the universality of the interface descriptor for different communication protocol types and improves the universality of the communication interface for different communication protocol types, thereby reducing the error rate during use.

In some embodiments, the data transmission module 820 is further configured to encrypt, through an encryption component, and transmit data between the target service node and the target resource location.

In some embodiments, the data transmission request can be a data sending request, and the data transmission request may carry data to be transmitted.

Correspondingly, the data transmission module 820 further includes: a first transmitting unit, a second transmitting unit and a third transmitting unit.

The first transmitting unit is configured to: send the data to be transmitted to the encryption component, in which the data to be transmitted is encrypted by the encryption component based on an encryption mode corresponding to the target communication protocol type.

The second transmitting unit is configured to: receive encrypted data to be fed back by the encryption component.

The third transmitting unit is configured to: send the encrypted data to be transmitted to the target resource location.

In some embodiments of the disclosure, the data transmission request may be a data obtaining request.

Correspondingly, the data transmission module 820 may include a fourth transmitting unit, a fifth transmitting unit, and a sixth transmitting unit.

The fourth transmitting unit is configured to: obtain encrypted data to be transmitted from the target resource location.

The fifth transmitting unit is configured to: send the encrypted data to be transmitted to the encryption component, in which the encrypted data to be transmitted is decrypted by the encryption component based on a decryption mode corresponding to the target communication protocol type.

The sixth transmitting unit is configured to: send the data to be transmitted to the target service node.

In some embodiments of the disclosure, the apparatus 800 for transmitting data may further include: an instruction receiving module and an operation executing module.

The instruction receiving module is configured to: before receiving the data transmission request from the target service node, receive an interface initialization instruction from the target service node, in which the interface initialization instruction carries the target communication protocol type.

The operation executing module is configured to: in response to the interface initialization instruction, perform an interface initialization operation to activate the target communication protocol corresponding to the target communication protocol type.

In some embodiments of the disclosure, the data transmission request may be a data sending request, and the data transmission request carries data to be transmitted.

The data transmission module 820 may be configured to: send the data to be transmitted to the target resource location.

Correspondingly, the data transmission apparatus 800 may further include: a data sending module. The data sending module is configured to: after sending the data to be transmitted to the target resource location, send the data to be transmitted to a message subscription node using the target communication protocol, so that the message subscription node may send the data to be transmitted to an external device through a network communication mode.

In some embodiments of the disclosure, the preset communication protocol may be a network communication protocol or a non-network communication protocol.

In some embodiments of the disclosure, the apparatus 800 for transmitting data includes: a request converting module and a request parsing module.

The request converting module is configured to: after receiving the data transmission request from the target service node, convert the data transmission request into a preset encoding type.

The request parsing module is configured to: obtain the target interface descriptor by parsing the data transmission request.

In some embodiments of the disclosure, the request receiving module 810 is configured to: receive the data transmission request based on an interface abstraction layer.

Correspondingly, the data transmission module 820 may be further configured to: forward the data between the target service node and the target resource location using the target communication protocol based on a communications protocol implementation layer.

It is noteworthy that the apparatus 800 for transmitting data illustrated in FIG. 8 may perform various blocks in method embodiments illustrated in FIG. 1 and realize various processes and effects in method embodiments illustrated in FIG. 1, which will not be described herein.

Figure 9:
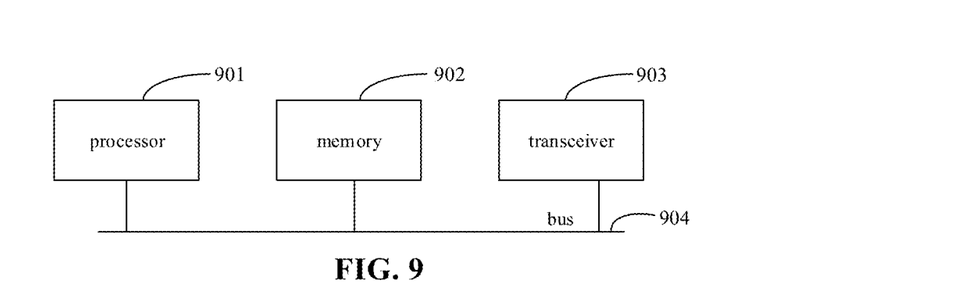
FIG. 9 is a schematic diagram illustrating a device for transmitting data according to an embodiment of the disclosure.

FIG. 9 is a schematic diagram illustrating a device for transmitting data according to an embodiment of the disclosure.

In some embodiments of the disclosure, the device for transmitting data illustrated in FIG. 9) may be a device belonging to an application service node installed with a communication interface in a vehicle network.

The vehicle network may be a transport network formed by a plurality of application service nodes applied to support automotive applications. One application service node may be a controller or a process in a controller. The communication interface may be a software interface.

As illustrated in FIG. 9, the device for transmitting data may include a processor 901 and a memory 902 for storing computer program instructions.

In some implementations, the processor 901 may include a central processing unit (CPU) or an Application Specific Integrated Circuit (ASIC), or may be implemented as one or more integrated circuits to implement the embodiments of the disclosure.

The memory 902 may include a large-capacity storage for storing information or instructions. By way of example and not limitation, the memory 902 may include a hard disk drive (HDD), a floppy disk drive, a flash memory, an optical disk, a magnetic disk, a magnetic tape, or a Universal Serial Bus (USB) drive or a combination of two and more of these. When appropriate, the memory 902 may include removable or non-removable (or fixed) medium, and the memory 902 may be internal or external to the integrated gateway device. In specific embodiments, the memory 902 is a non-volatile solid state memory. In specific embodiments, the memory 902 includes a Read-Only Memory (ROM). When appropriate, the ROM may be a mask-programmed ROM, a programmable ROM (PROM), an Erasable PROM (EPROM), an Electrically Erasable PROM (EEPROM), an electrically alterable ROM (EAROM), a flash memory, or a combination of two or more of these.

The processor 901 reads and executes the computer program instructions stored in the memory 902, to implement blocks of the method for transmitting data according to embodiments of the disclosure.

In an example, the device for transmitting data may also include: a transceiver 903 and a bus 904. As illustrated in FIG. 9, the processor 901, the memory 902 and the transceiver 903 are connected to and can communication with each other via the bus 904.

The bus 904 includes hardware, software or both. By way of example, but not limitation, the bus may include an Accelerated Graphics Port (AGP) or other graphics bus, an Extended Industry Standard Architecture (EISA) bus, a Front Side BUS (FSB), a Hyper Transport (HT) interconnect, an Industrial Standard Architecture (ISA) bus, an unlimited bandwidth interconnect, a Low Pin Count (LPC) bus, a memory bus, a Micro Channel Architecture (MCA) bus, a Peripheral Component Interconnect (PCI) bus, a PCI-Express (PCI-X) bus, a Serial Advanced Technology Attachment (SATA) bus, a Video Electronics Standards Association Local Bus (VLB) or other suitable bus or a combination of two or more of these. When appropriate, the bus 904 may include one or more buses. Although specific buses are described and illustrated in the embodiments of the disclosure, the disclosure contemplates any suitable bus or interconnect.

Embodiments of the disclosure also provide a computer-readable storage medium having a computer program stored thereon. When the computer program is executed by a processor, the processor is caused to perform the methods for transmitting data according to embodiments of the disclosure.

The storage medium described above may, for example, include a memory 902 for storing computer program instructions. The instructions described above may be executed by the processor 901 to perform the methods for transmitting data according to embodiments of the disclosure. In some embodiments, the storage medium may be a non-transitory computer-readable storage medium. For example, the non-transitory computer-readable storage medium may be, for example, a ROM, a Random Access Memory (RAM), a Compact Disc ROM (CD-ROM), a magnetic tape, a floppy disk and an optical data storage device.

Embodiments of the disclosure also provide a computer program product including a computer program. When the computer program is executed by a processor, the methods for transmitting data according to embodiments of the disclosure are performed.

Embodiments of the disclosure also provide a computer program including computer program codes. When the computer program codes are executed by a computer, the methods for transmitting data according to embodiments of the disclosure are performed.

With the method, the apparatus, the device, the computer-readable storage medium, the computer program product and the computer program according to embodiments of the disclosure, after receiving the data transmission request from the target service node, since the target interface descriptor carried by the data transmission request is a common descriptor used by a vehicle network to which the target service node belongs, the target resource location and the target communication protocol type in the target interface descriptor may be read under any communication protocol type. In response to the data transmission request, data is forwarded between the target service node and the target resource location using the target communication protocol corresponding to the target communication protocol type in the plurality of communication protocols. Therefore, data transmission between the target service node and the target resource location may be realized under any communication protocol type, which improves the universality of the interface descriptor for different communication protocol types and improves the universality of the communication interface for different communication protocol types, thereby reducing the error rate during use.

It is noteworthy that the foregoing explanatory description of the method and apparatus embodiments is applicable to the apparatus, the computer-readable storage medium, the computer program product and the computer program of the above embodiments, which will not be repeated herein.

It is noteworthy that the relational terms herein, such as "first" and "second", are used only for differentiating one entity or operation, from another entity or operation, which, however do not necessarily require or imply that there should be any real relationship or sequence. Moreover, the terms "comprise", "include" or any other variations thereof are meant to cover non-exclusive including, so that the process, method, article or device comprising a series of elements do not only comprise those elements, but also comprise other elements that are not explicitly listed or also comprise the inherent elements of the process, method, article or device.

The foregoing are only specific implementations of the disclosure to enable those skilled in the art to understand or realize the disclosure. Various modifications to these embodiments will be apparent to those skilled in the art, and the general principles defined herein may be realized in other embodiments without departing from the spirit or scope of the disclosure. Therefore, the disclosure will not be limited to these embodiments described herein, but will be subject to the broadest scope consistent with the principles and novel features disclosed herein.

All embodiments of the disclosure may be performed alone or in combination with other embodiments and are considered to be within the scope of protection claimed herein.

What is claimed is:

1. A method for transmitting data, comprising:
   receiving a data transmission request from a target service node, wherein the data transmission request carries a target interface descriptor, the target interface descriptor comprises a target resource location address and a target communication protocol type, the target interface descriptor is a common descriptor used by a vehicle network to which the target service node belongs, and the target interface descriptor further comprises a communication parameter; and
   in response to the data transmission request, forwarding data between the target service node and a target resource location corresponding to the target resource location address using a target communication protocol corresponding to the target communication protocol type in a plurality of preset communication protocols;
   wherein the data transmission request is a data sending request and the data transmission request carries data to be transmitted;
   wherein forwarding data between the target service node and the target resource location corresponding to the target resource location address comprises:
   sending the data to be transmitted to the target resource location; and
   wherein after sending the data to be transmitted to the target resource location, the method further comprises:
   sending the data to be transmitted to a message subscription node using the target communication protocol, wherein the message subscription node is configured to send the data to be transmitted to an external device through a network communication mode.

2. The method of claim 1, wherein forwarding data between the target service node and the target resource location corresponding to the target resource location address comprises:
   encrypting, through an encryption circuit, and transmitting data between the target service node and the target resource location.

3. The method of claim 2,
   wherein encrypting, through the encryption circuit, and transmitting data between the target service node and the target resource location comprises:
   sending the data to be transmitted to the encryption circuit, wherein the data to be transmitted is encrypted by the encryption circuit based on an encryption mode corresponding to the target communication protocol type;
   receiving encrypted data to be transmitted fed back by the encryption circuit; and
   sending the encrypted data to be transmitted to the target resource location.

4. The method of claim 1, before receiving the data transmission request from the target service node, further comprising:

receiving an interface initialization instruction from the target service node, wherein the interface initialization instruction carries the target communication protocol type; and in response to the interface initialization instruction, performing an interface initialization operation to activate the target communication protocol corresponding to the target communication protocol type.

5. The method of claim 1, wherein each of the plurality of preset communication protocols is a network communication protocol or a non-network communication protocol.

6. The method of claim 1, after receiving the data transmission request from the target service node, further comprising:

converting the data transmission request into a preset encoding type; and obtaining the target interface descriptor by parsing the data transmission request.

7. The method of claim 1, wherein receiving the data transmission request from the target service node comprises:

receiving the data transmission request based on an interface abstraction layer;

wherein forwarding data between the target service node and the target resource location corresponding to the target resource location address using the target communication protocol corresponding to the target communication protocol type in the plurality of preset communication protocols comprises:

forwarding data between the target service node and the target resource location using the target communication protocol based on a communications protocol implementation layer.

8. A device for transmitting data, comprising:

a processor; and a memory for storing executable instructions;

wherein the processor is configured to read the executable instructions from the memory and to execute the executable instructions to:

receive a data transmission request from a target service node, wherein the data transmission request carries a target interface descriptor, the target interface descriptor comprises a target resource location address and a target communication protocol type, the target interface descriptor is a common descriptor used by a vehicle network to which the target service node belongs;

and the target interface descriptor further comprises a communication parameter; and in response to the data transmission request, forward data between the target service node and a target resource location corresponding to the target resource location address using a target communication protocol corresponding to the target communication protocol type in a plurality of preset communication protocols;

wherein the data transmission request is a data sending request and the data transmission request carries data to be transmitted;

wherein the processor is further configured to:

send the data to be transmitted to the target resource location; and send the data to be transmitted to a message subscription node using the target communication protocol, wherein the message subscription node is configured to send the data to be transmitted to an external device through a network communication mode.

9. The device of claim 8, wherein the processor is configured to:

encrypt, through an encryption circuit, and transmit data between the target service node and the target resource location.

10. The device of claim 9, wherein the processor is configured to:

send the data to be transmitted to the encryption circuit, wherein the data to be transmitted is encrypted by the encryption circuit based on an encryption mode corresponding to the target communication protocol type;

receive encrypted data to be transmitted fed back by the encryption circuit; and send the encrypted data to be transmitted to the target resource location.

11. The device of claim 8, wherein the processor is further configured to:

receive an interface initialization instruction from the target service node, wherein the interface initialization instruction carries the target communication protocol type; and in response to the interface initialization instruction, perform an interface initialization operation to activate the target communication protocol corresponding to the target communication protocol type.

12. The device of claim 8, wherein each of the plurality of preset communication protocols is a network communication protocol or a non-network communication protocol.

13. The device of claim 8, wherein the processor is further configured to:

convert the data transmission request into a preset encoding type; and obtain the target interface descriptor by parsing the data transmission request.

14. The device of claim 8, wherein the processor is configured to:

receive the data transmission request based on an interface abstraction layer; and forward data between the target service node and the target resource location using the target communication protocol based on a communications protocol implementation layer.

15. A non-transitory computer-readable storage medium, having a computer program stored thereon, wherein when the computer program is executed by a processor, the processor is caused to perform the method for transmitting data; the method comprising:

receiving a data transmission request from a target service node, wherein the data transmission request carries a target interface descriptor, the target interface descriptor comprises a target resource location address and a target communication protocol type, the target interface descriptor is a common descriptor used by a vehicle network to which the target service node belongs; and the target interface descriptor further comprises a communication parameter; and in response to the data transmission request, forwarding data between the target service node and a target resource location corresponding to the target resource location address using a target communication protocol corresponding to the target communication protocol type in a plurality of preset communication protocols;

wherein the data transmission request is a data sending request and the data transmission request carries data to be transmitted;

wherein forwarding data between the target service node and the target resource location corresponding to the target resource location address comprises:
sending the data to be transmitted to the target resource location; and
wherein after sending the data to be transmitted to the target resource location, the method further comprises:
sending the data to be transmitted to a message subscription node using the target communication protocol, wherein the message subscription node is configured to send the data to be transmitted to an external device through a network communication mode.

16. The non-transitory computer-readable storage medium of claim 15, wherein forwarding data between the target service node and the target resource location corresponding to the target resource location address comprises:
encrypting, through an encryption circuit, and transmitting data between the target service node and the target resource location.

* * * * *